United States Patent
Li et al.

(10) Patent No.: US 7,288,906 B2
(45) Date of Patent: Oct. 30, 2007

(54) MANUALLY OPERATED BRUSHLESS DIRECT CURRENT MOTOR

(75) Inventors: Ching-Lieh Li, Taipei Hsien (TW); Chung-Hsin Huang, Taipei Hsien (TW)

(73) Assignee: Tamkang University, Taipei Hsien (TW)

( * ) Notice: Subject to any disclaimer, the term of this patent is extended or adjusted under 35 U.S.C. 154(b) by 0 days.

(21) Appl. No.: 11/476,667

(22) Filed: Jun. 29, 2006

(65) Prior Publication Data

US 2007/0126379 A1    Jun. 7, 2007

(30) Foreign Application Priority Data

Dec. 6, 2005    (TW) ............................ 94142966 A

(51) Int. Cl.
*H02P 1/18* (2006.01)

(52) U.S. Cl. ................. 318/254; 318/538; 324/139; 73/116

(58) Field of Classification Search ............... None
See application file for complete search history.

(56) References Cited

U.S. PATENT DOCUMENTS

| | | | | |
|---|---|---|---|---|
| 334,823 A | * | 1/1886 | Tesla | 310/244 |
| 382,845 A | * | 5/1888 | Tesla | 310/219 |

OTHER PUBLICATIONS

All Motion® "EZSV17 Servo Motor Controller + Driver Description" and "EZ Servo EZSV17 Wiring Diagram for BLDC Motor"□□□□www.allmotion.com/EZSV17description.htm□□Jan. 2004.*
"Brush and Brushless Motors" □□1999 edition, PT Design Magazine□□Take from the Article: 20-Minute Tune-up□□.*
"Experiments with Motors" □□□□www.coolmagnetman.com/magacmot.htm□□Jan. 2005.*
"DC Motor Circuit Troubleshooting Trainer" Model No. H-113□□□□www.veejer.com/dc_kit.html□□Mar. 2005.*
"DC Brushless Motorized Kit" □□Cyclone Taiwan□□□□www.alibaba.com/catalog/11065042/DC_Brushless_Motorized_Kit/showimg.html.*
"Remote Laboratory for a Brushless DC Motor"□□Autors: Tatsuya Kikuchi, Takashi Kenjo, Shuichi Kukuda□□2001 IEEE□□www.ewh.ieee.org/soc/es/May 2001/02/Begin.htm.*
"Back to Motor School" □□Mechanical Engineering Magazine, Dec. 2003□□Associated Editor: Paul Sharke□□□□www.memagazine.org/backissues/membersonly/dec03/features/motorschl/motorschl.html.*
Servo Magnetics Inc.□□"Conventional Brush Motor" and "Convention Brushless Motor"□□□□www.servomag.com/brush_motors.html    □□www.servomag.com/conventional_bldc_motors.html.*

* cited by examiner

*Primary Examiner*—Lincoln Donovan
*Assistant Examiner*—Eduardo Colon Santana
(74) *Attorney, Agent, or Firm*—Birch, Stewart, Kolasch & Birch, LLP

(57) ABSTRACT

A manually operated brushless DC motor is disclosed herein, which is an educational electric motor and can overcome the shortcoming hard to visualize the movement of a motor due to the high-speed rotation of the motor. The manually operated brushless DC motor according to the present invention provides two switches to replace the brushes used in a conventional motor. Users/learners have to alternatively press the switches to complete a closed circuit and drive the motor to rotate. Only when the rotor rotates in synchronism with the pressing rate of the switches, the rotor accelerates. Otherwise the rotation speed of the rotor decreases. The manually operated brushless DC motor provides the users/learners with the opportunity of viewing the rotor rotating in a slow motion, and the experience of manually operating the motor.

6 Claims, 2 Drawing Sheets

MANUALLY OPERATED BRUSHLESS DIRECT CURRENT MOTOR

BACKGROUND OF THE INVENTION

1. Field of the Invention

The present invention relates to a direct current (DC) motor, and in particular to a manually operated brushless DC motor that is used mainly for instruction and demonstration.

2. The Prior Arts

In general, motors work by the interactions between magnetism and electric currents. A DC motor is capable of making high-speed rotation. It is achieved by using brushes and a commutator to synchronize the rotation speed of a rotor with the rate that a current changes its direction, so that the magnetic force generated by the current keeps driving the rotor of the motor in the same direction.

Because of the high-speed rotation, schools and institutions are unable to provide a low-speed motor or a generator to students for viewing its motion clearly and a hand-on learning. Conventional devices for demonstrating electric machines still keep the brushes. Therefore, the problem mentioned above has not been solved.

SUMMARY OF THE INVENTION

In order to overcome the shortcomings and drawbacks of the prior art, a primary objective of the present invention is to provide a manually operated brushless DC motor. The DC motor according to the present invention is amended from the design of a conventional DC motor. Two switches replace brushes provided in the conventional motor, thus realizing an interactive motor, which needs both hands to operate. The user/learner may experience the interactive mechanism of the magnetism and the current inside the motor in person. The interaction between the invisible electricity and magnetism can be visualized and the learning is much more interesting. The users/learners can further understand the synchronous mechanism of the conventional motor.

The manually operated brushless DC motor according to the present invention comprises a power source, a set of magnets, and a rotor, which are roughly the same as those of the conventional motor. In order to achieve the objective mentioned above, the manually operated brushless DC motor changes the design of bearings and further includes a set of switches to control the current supplied to the rotor. When the user/learner presses the switches alternatively, the switches work just like the brushes, thus driving the rotor into rotation. Therefore, the user/learner participates the running of the DC motor, thereby further appreciating the operation principle of the DC motor.

BRIEF DESCRIPTION OF THE DRAWINGS

The present invention will be apparent to those skilled in the art by reading the following detailed description of preferred embodiments thereof, with reference to the attached drawings, in which.

DETAILED DESCRIPTION OF THE PREFERRED EMBODIMENT

The purpose, construction, features, functions and advantages of the present invention can be appreciated and understood more thoroughly through the following detailed description with reference to the attached drawings.

Figure 1:
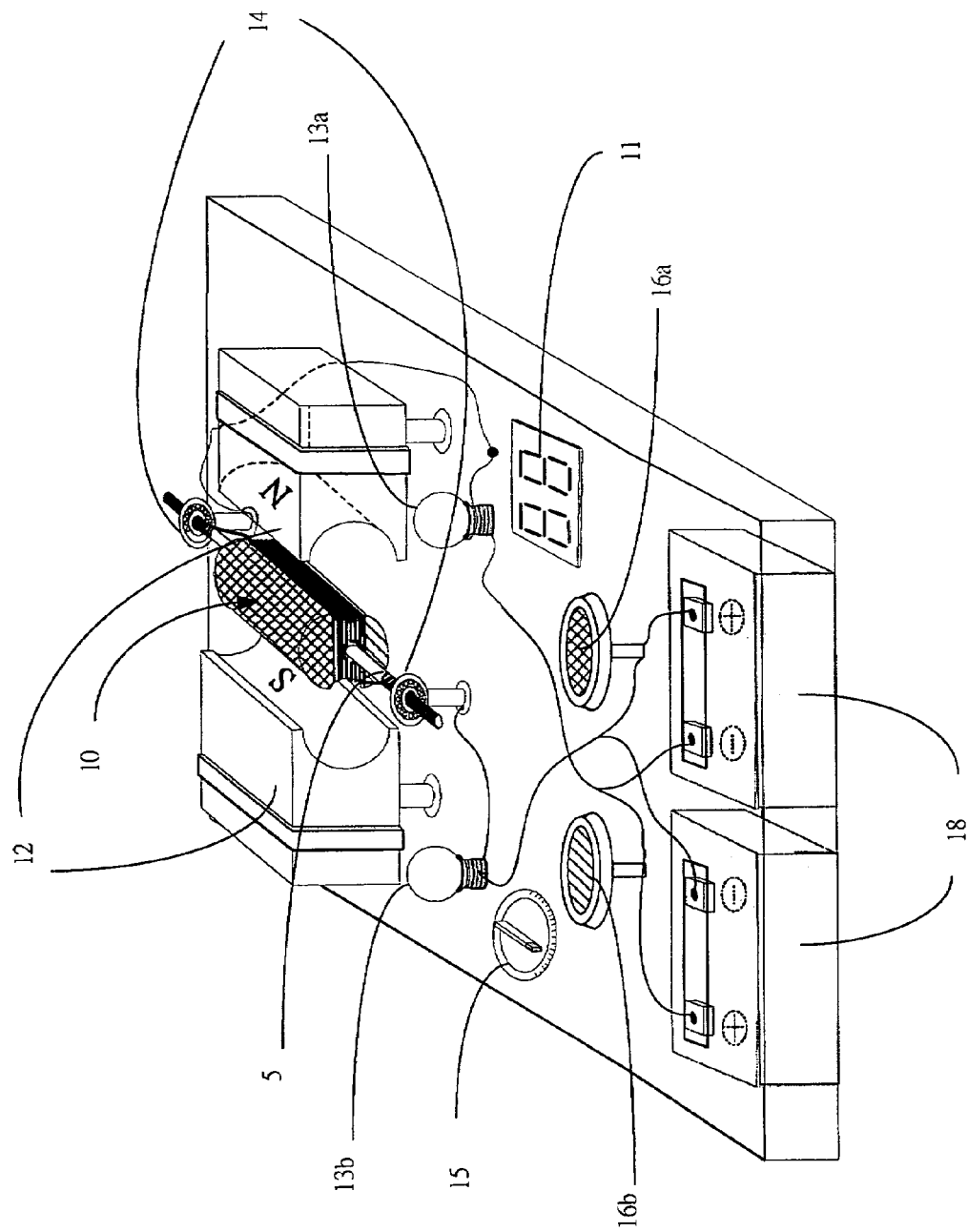
FIG. 1 is a schematic diagram of a manually operated brushless DC motor according to a first embodiment of the present invention.

FIG. 1 is a schematic diagram of a manually operated brushless DC motor according to a first embodiment of the present invention. The manually operated DC motor according to the present invention is similar to a conventional DC motor and comprises a power source 18 (which can be a battery or a power supplier, and it is two batteries in the first embodiment), a set of magnets 12, and a rotor 10 with coil wire wound around. A rotation axle 5 holds the rotor 10 and is supported by a set of bearings 14. The rotor 10 is placed between the magnets 12. However, the structures of the bearings 14 are different from the ones used in the conventional DC motor. The bearings 14 do not include a brush, thus achieving the special effects of the present invention.

In brief, in the manually operated brushless DC motor according to the present invention, the bearings 14 are used to provide the electrical connection required between the coil wire of the rotors 10 and the power source 18. Switches 16a and 16b are also electrically connected to the bearings 14 and the power source 18. They are used to break or open a circuit, and provide the current to flow in different directions respectively. Thus the alternatively pressed switches 16a and 16b work just like the brushes to complete a closed circuit, and change the fields of electromagnet, thereby making the rotor 10 to rotate. If a learner stops pressing the switches 16a and 16b, the circuit is an open circuit. There is no magnetic force to drive the rotor 10 to rotate. Thus the rotation of the rotor 10 does not accelerate. Only when the rotor 10 rotates in synchronism with the pressing rate of the switches 16a and 16b, the rotor 10 accelerates. Otherwise it decelerates. Therefore, the manually operated brushless DC motor provides the user/learner with the opportunity of viewing the rotor rotating in a slow motion, and the experience of manually operating the motor. In this manner, strictly speaking, the user/learner can be considered as a part of the motor in operation.

In order for the user/learner to have a better timing in pressing the switches 16a and 16b alternatively, the upper and lower half portions of the rotor 10 are painted with different colors respectively. The switches 16a and 16b are also painted with the same colors corresponding to the rotor 10. Moreover, light bulbs 13a and 13b are disposed between the bearings 14 and the switches 16a and 16b. The light bulbs 13a and 13b will flash light when power is supplied to the rotor 10, thereby confirming that the power is really supplied to the rotor 10. Furthermore, a timing relay 15 is used to control the timing of the motor operation. The circuit will be automatically disconnected when the operation duration ends. Also, a seven-segment display 11 is provided to show the counted number of pressing the switches.

Figure 2:
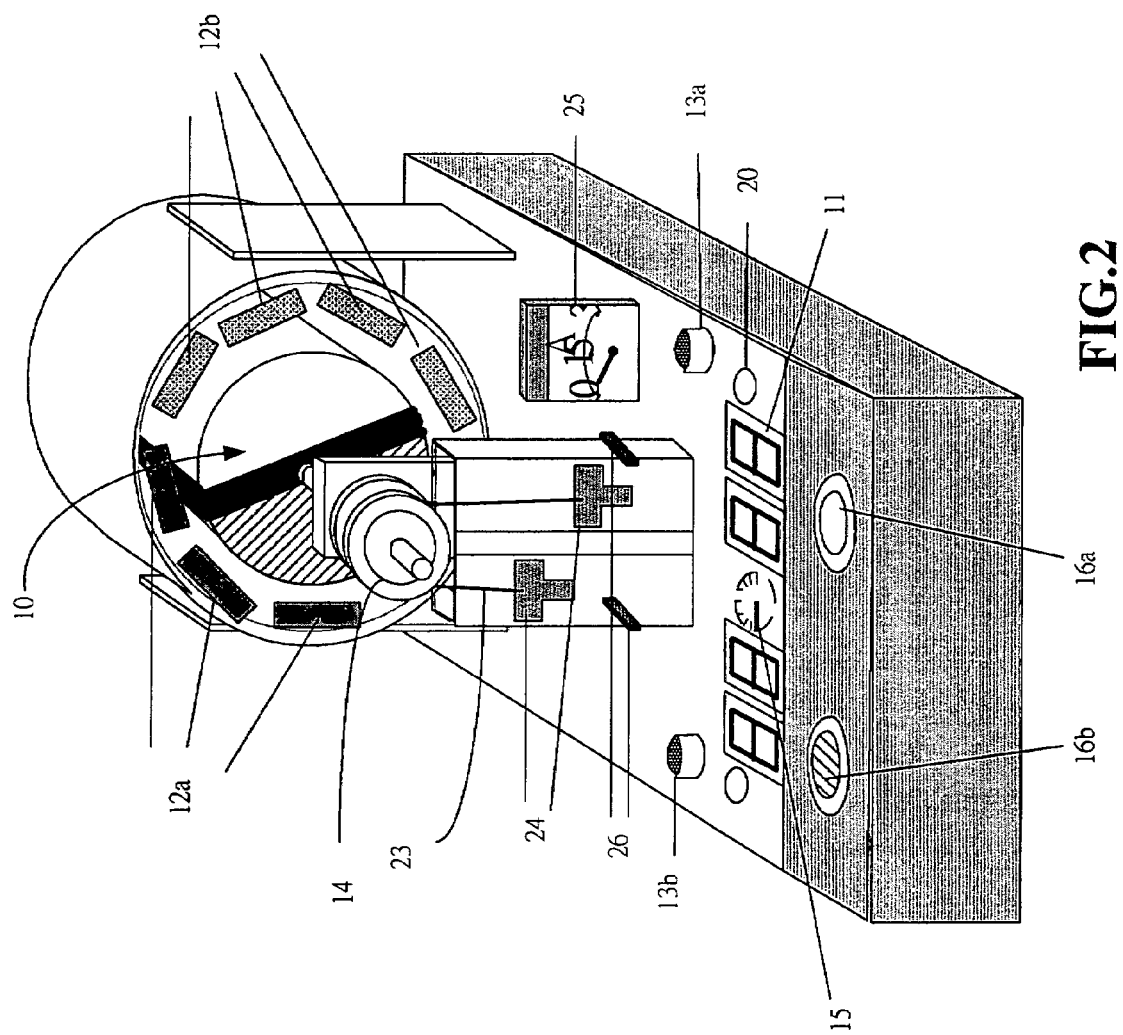
FIG. 2 is a schematic diagram of a manually operated brushless DC motor according to a second embodiment of the present invention.

FIG. 2 is a schematic diagram of a manually operated brushless DC motor according to a second embodiment of the present invention. As shown in FIG. 2, in addition to a rotor 10, a set of bearings 14, light bulbs 13a and 13b, a timing relay 15, a set of seven-segment display 11, a set of switches 16a and 16b and a power source 18, which are the same as those of the first embodiment, the manually operated brushless DC motor according to the second embodiment further comprises the following devices: a set of two sensor plates 24 hung around one of the bearings 14 by a wire 23, two sensors 26 provided at the respective sensing positions, a speaker 20, an analog ampere meter 25, a counter (not shown), and a plurality of magnets 12a and 12b whose N poles and S poles are distributed evenly on the inside surface of a stator. The magnets 12a and 12b replace a set of magnets 12 of the first embodiment, and provide an operation environment without a balance point where the rotor gets stuck.

The sensors 26 are installed at specific positions to detect the existence of the sensor plates 24. When the rotor 10 rotates and drives the sensor plates 24 moving upward and downward, the sensors 26 detect the sensor plates 24 passing by. The counter receives signals from the sensors 26 and counts repetitions of signals. Then the seven-segment displays 11 show the counted numbers. Likewise, the speaker 20 takes the signals from the sensors 26 and turns them back into sound. Moreover, the analog ampere meter 25 is provided to show the magnitude and direction of current when the switches 16a and 16b are pressed.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A manually operated brushless direct current (DC) motor, comprising:
   a power source;
   a set of magnets;
   a rotor with coil wire wound around, and placed between the magnets by means of a rotation axle;
   a set of bearings used to support the rotation axle, and to provide the connection required between the coil wire of the rotor and the power source without a brush;
   a set of switches electrically connected to the bearings and the power source respectively;
   a set of sensor plates, hung around one of the bearings by a wire; and
   a set of sensors installed at specific places to detect the existence of the sensor plates, and generating a responsive signal;
   wherein the alternatively pressed switches work just like brushes of a conventional motor and make the rotor to rotate; and
   wherein the sensors detect the sensor plates intermittently passing by when the rotor rotates to drive the sensor plates moving upward and downward (back and forth).

2. The manually operated brushless direct current (DC) motor as claimed in claim 1, wherein the power source comprises at least a battery.

3. The manually operated brushless direct current (DC) motor as claimed in claim 1, wherein an upper and lower half portions of the rotor are painted with different colors, and the switches are painted with the same colors corresponding to the rotor.

4. The manually operated brushless direct current (DC) motor as claimed in claim 1, wherein the set of magnets comprises a plurality of magnets whose N poles and S poles are evenly distributed on an inside surface of a stator of the motor.

5. The manually operated brushless direct current (DC) motor as claimed in claim 1, further comprising a counter used to count the numbers of signals from the sensors and to show the counting results.

6. The manually operated brushless direct current (DC) motor as claimed in claim 1, further comprising a speaker used to give forth a sound when receiving the signal from the sensors.

* * * * *